US008812469B2

(12) United States Patent
Megerian et al.

(10) Patent No.: US 8,812,469 B2
(45) Date of Patent: Aug. 19, 2014

(54) CONFIGURABLE PERSISTENT STORAGE ON A COMPUTER SYSTEM USING A DATABASE (75) Inventors: Mark G. Megerian, Rochester, MN (US); Andrew T. Tauferner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 819 days.

(21) Appl. No.: 12/121,172

(22) Filed: May 15, 2008

(65) Prior Publication Data

US 2009/0287712 A1    Nov. 19, 2009

(51) Int. Cl.
G06F 7/00      (2006.01)
G06F 17/30     (2006.01)

(52) U.S. Cl.
USPC ............... 707/705; 713/2; 717/173; 709/208; 709/222

(58) Field of Classification Search
CPC .................... G06F 15/177; G06F 17/30997
USPC ........................................ 713/1, 2; 707/705
See application file for complete search history.

(56) References Cited

U.S. PATENT DOCUMENTS

| | | | |
|---|---|---|---|
| 5,878,241 A | 3/1999 | Wilkinson et al. | |
| 5,961,642 A * | 10/1999 | Lewis | 713/1 |
| 6,366,945 B1 | 4/2002 | Fong et al. | |
| 6,453,426 B1 * | 9/2002 | Gamache et al. | 714/4 |
| 6,671,699 B1 * | 12/2003 | Black et al. | 1/1 |
| 6,711,691 B1 | 3/2004 | Howard et al. | |
| 6,854,009 B1 * | 2/2005 | Hughes | 709/220 |
| 7,010,617 B2 * | 3/2006 | Kampe et al. | 709/248 |
| 7,475,274 B2 * | 1/2009 | Davidson | 714/4 |
| 7,506,335 B1 * | 3/2009 | Wooff et al. | 717/173 |
| 7,523,231 B1 * | 4/2009 | Gupta et al. | 710/36 |
| 7,664,836 B2 * | 2/2010 | Kim | 709/222 |
| 7,694,305 B2 | 4/2010 | Karlsson et al. | |
| 7,702,965 B1 | 4/2010 | Planki et al. | |
| 7,818,010 B2 | 10/2010 | Matteo et al. | |
| 2001/0042123 A1 | 11/2001 | Moody et al. | |
| 2002/0069235 A1 | 6/2002 | Chen | |
| 2003/0084088 A1 | 5/2003 | Shaffer | |
| 2003/0091038 A1 | 5/2003 | Hagedorn | |
| 2003/0140132 A1 * | 7/2003 | Champagne et al. | 709/223 |
| 2003/0177296 A1 | 9/2003 | Kurth | |
| 2004/0210648 A1 * | 10/2004 | Woodruff | 709/221 |
| 2005/0141554 A1 | 6/2005 | Hammarlund et al. | |
| 2005/0155033 A1 | 7/2005 | Luoffo et al. | |
| 2005/0198641 A1 | 9/2005 | Eilam et al. | |

(Continued)

OTHER PUBLICATIONS

Moreira et al., Blue Gene/L Programming and Operating Environment, Mar./May 2005, IBM, vol. 49, No. 2/3, pp. 367-376.*

(Continued)

*Primary Examiner* — Marc Somers
(74) *Attorney, Agent, or Firm* — Rabin & Berdo, P.C.

(57) ABSTRACT

A method for persistent data storage on a computer system with a kernel by retrieving configuration information regarding a system operation request and then deciding based on the configuration information whether to execute it with special persistent storage or to not do so. The configuration information may be stored on a central node or may be encoded onto any of the nodes. The special persistent storage may be a database. The method may further be implemented by a computer program product. It also may be implemented on a computer system.

17 Claims, 4 Drawing Sheets

(56) References Cited

U.S. PATENT DOCUMENTS

| | | | |
|---|---|---|---|
| 2005/0278523 A1* | 12/2005 | Fortin et al. | 713/1 |
| 2005/0289362 A1 | 12/2005 | Merkin et al. | |
| 2006/0190505 A1* | 8/2006 | DeMaio et al. | 707/204 |
| 2006/0270413 A1 | 11/2006 | Matteo et al. | |
| 2007/0112864 A1 | 5/2007 | Ben-Natan | |
| 2008/0040541 A1* | 2/2008 | Brockmann | 711/114 |
| 2008/0052322 A1* | 2/2008 | Gusciora | 707/200 |
| 2008/0177867 A1* | 7/2008 | Giampapa et al. | 709/220 |
| 2008/0201468 A1 | 8/2008 | Titus | |
| 2008/0288746 A1 | 11/2008 | Inglett et al. | |
| 2008/0298273 A1 | 12/2008 | Armbruster et al. | |
| 2009/0024830 A1 | 1/2009 | Budnik et al. | |
| 2009/0300625 A1 | 12/2009 | Branson et al. | |

OTHER PUBLICATIONS

U.S. Appl. No. 11/780,072, filed Jul. 19, 2007, "Executing Multiple Instructions Multiple Data ('MIMD') Programs on a Single Instruction Multiple Data ('SIMD') Machine" by Thomas A, Budnik et al.

* cited by examiner

CONFIGURABLE PERSISTENT STORAGE ON A COMPUTER SYSTEM USING A DATABASE

CROSS REFERENCE TO RELATED APPLICATIONS

This present application is related to co-pending US patent applications entitled—"Resource Management on a Computer System Utilizing Hardware and Environmental Factors" and "Scaling and Managing Work Requests on a Massively Parallel Machine", filed concurrently herewith, and assigned Ser. Nos. 12/121,096 and 12/121,262, respectively.

BACKGROUND

This invention relates to distributed storage. More specifically, it relates to configurable and persistent storage on a computer system using a database.

Computer systems are composed of many different components including hardware and software resources. Massively parallel computer systems are an example of these computer systems and are also composed of nodes, or connection points. These nodes may serve as input or output (I/O) points, or points that perform a computational function and forward on data (also known as compute nodes). Because of the space and power consumed by disk devices, the nodes often have no local data storage. Additionally, any data access that does take place has a decreased reliability due to the large number of nodes.

Typically, it is desired to have data available from one boot to another for a given node or between nodes. For example, data can be sent to a remote file system for storage, but some explicit means of organizing the data from each node should be implemented by the fileserver and the input/output nodes. It is up to the nodes and the fileserver to adhere to whatever file or directory arrangement one implements. This arrangement is typically hard-wired into code running on multiple machines. However, hard-wired code is prone to errors if either end of such a solution is out of sync with the other. Such a solution might also be prone to concurrent access issues.

BRIEF SUMMARY

A method for persistent data storage on a massively parallel computer with a kernel by retrieving configuration information regarding a system operation request and then deciding based on the configuration information whether to execute it with special persistent storage or to not do so. The configuration information may be stored on a central node or may be encoded onto any of the nodes. The special persistent storage may be a database. The method may further be implemented by a computer program product. It also may be implemented on a computer system.

DETAILED DESCRIPTION

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to the present invention, computer systems are composed of many different components including hardware and software resources. For example, massively parallel computer systems are composed of many connection points, or nodes. These nodes often have no local data storage, but it is desired to have data available from one boot to another for a given node or between nodes. The present invention enables a configurable and persistent storage of these components (e.g. nodes) on a computer system using a data storage system such as a database.

Figure 1:
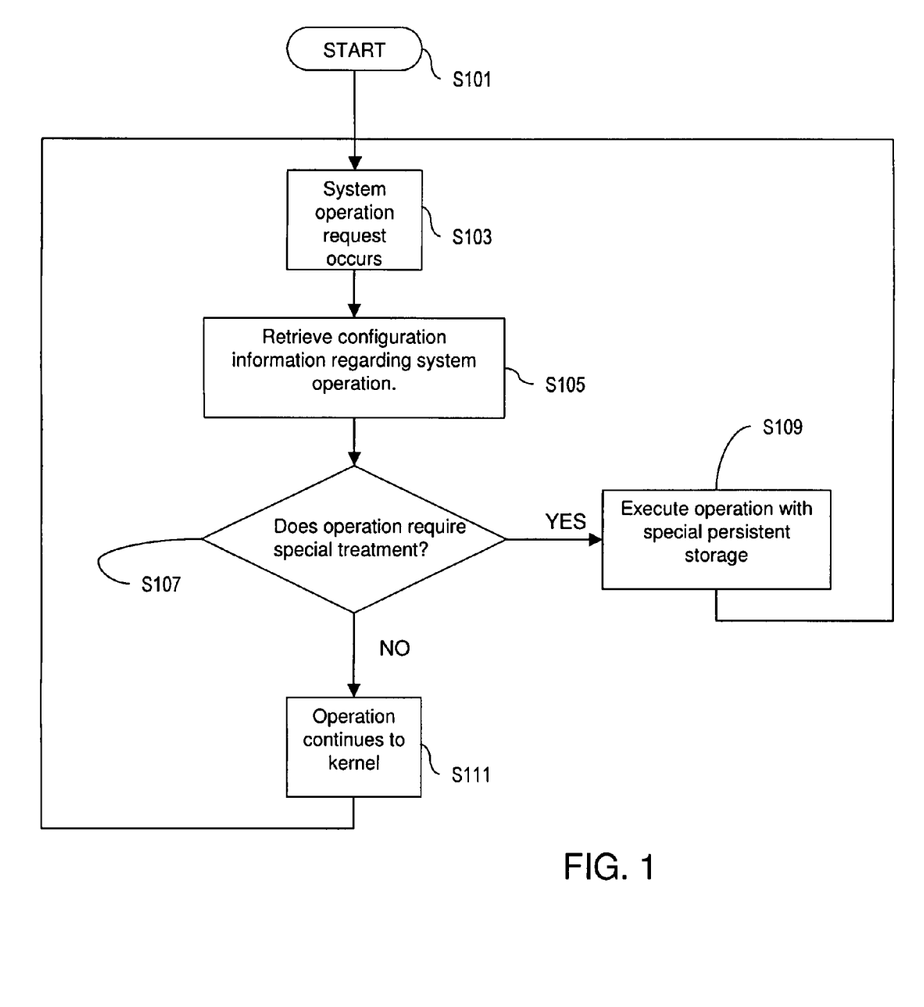
FIG. 1 is a flowchart showing system operation requests and the decision to execute the operations with persistent storage.

An exemplary method, computer program product and apparatus for persistent data storage on a computer system by retrieving configuration information about a system operation request and then deciding whether to execute it with special persistent storage according to embodiments of the present invention is described with reference to the accompanying drawings, beginning with FIG. 1. FIG. 1 is a flowchart depicting an embodiment of the steps involved in deciding whether system operation requests executed on computer components are to have special persistent storage.

These exemplary steps begin at S101. When a system operation request occurs in S103, configuration information regarding the system operation request is retrieved in S105. This information retrieval may also be implemented as a computer process. System operation requests include but are not limited to file I/O operations, memory allocation requests and system security requests.

Figure 2:
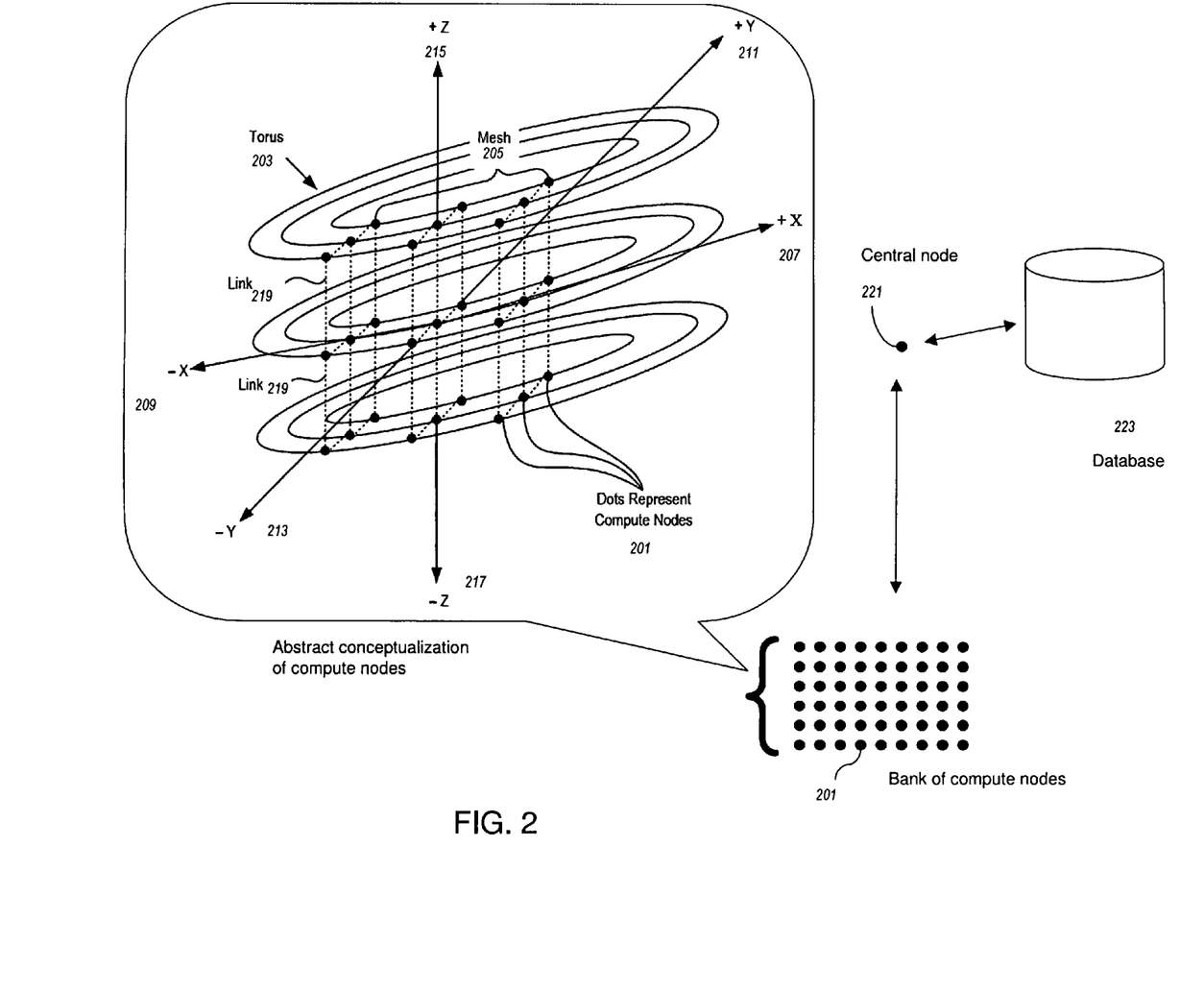
FIG. 2 is a diagram depicting an embodiment of the layout of the massively parallel machine and a database.

In one embodiment, at S103, the configuration is referenced by a device driver or other entity in the kernel when an I/O operation is requested. In S105, configuration information may be stored on a central node. For clarity purposes, FIG. 2 illustrates an exemplary data communications network optimized for point to point operations and the relationship of these nodes. In FIG. 2, dots represent compute nodes (201) of massively parallel machine, and the dotted lines between the dots represent data communications links (219) between compute nodes. The data communications links may be implemented with point to point data communications adapters, with data communications links on three axes, x, y, and z, and to and fro in six directions +x (207), −x (209), +y (211), −y (213), +z (215), and −z (217). The links and compute nodes are organized by this data communications network optimized for point to point operations into a three dimensional mesh (205) that wraps around to form a torus (203). Each compute node in the torus has a location in the torus that is uniquely specified by a set of x, y, z coordinates. For clarity of explanation FIG. 2 is illustrated with only 27 compute nodes, but one having skill in the art will recognize that a data communications network optimized for point to point operations in accordance with embodiments of the present invention may contain only a few compute nodes or may contain thousands of compute nodes.

This central node (221) (there is at least one central node, and alternative embodiments of the invention may have more than one) would always be available to other nodes (of which 201 is one) in the massively parallel machine. Therefore, each node could have different configuration information available to it, as stored on the central node. The configuration information may specify which files and directories are to contain persistent data for each node. In another embodiment of the invention, the configuration information may simply be identical for all the nodes and may be encoded on each individual node to reflect this. In yet another embodiment, each node may have a specific configuration encoded that can differ from other nodes on the parallel machine. It is contemplated that other means to store the configuration may be effected by someone having ordinary skill in the art.

At S107, the configuration will be referenced to determine if the file I/O operation should be intercepted and sent to a persistent data storage for execution as in S109. In one embodiment of the invention, this data storage is a database (223). The database reliably and efficiently executes the I/O operation. Neither the application nor operating system has to do anything explicit to access the persistent storage. If the configuration indicates that the operation, such as normal I/O system requests, are not to be executed with special persistent storage, then the requests are simply intercepted and rerouted in the kernel as depicted in S111. A person having ordinary skill in the art may contemplate passing the request to other entities other than the kernel or the database. This ends the treatment of the system operation request and the process is repeated again when another system operation request occurs.

Figure 3:
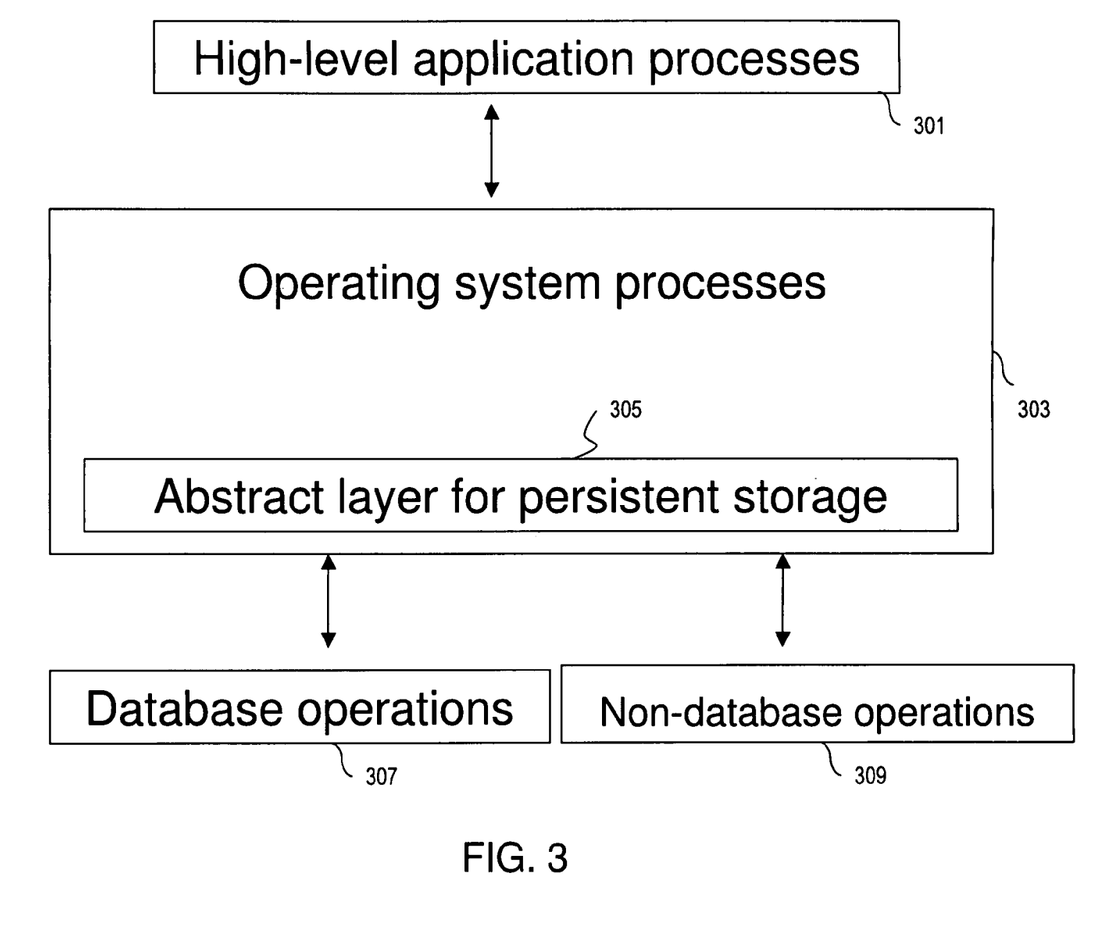
FIG. 3 is a diagram demonstrating the different layers and interactions between high-level applications and the low-level operations for database storage.

In one embodiment of the invention, a database is used for persistent storage of data. It is contemplated that any other data storage device or means may be used. FIG. 3 is a chart demonstrating the different layers and interactions between high-level applications (301) and the low-level operations in one embodiment for database storage (307) and other non-database operations (309). This interaction takes place through the intermediary operating system processes (303). From the perspective of the high-level applications running on the nodes, these operations do not appear to be database operations, and the application running on the nodes is not aware that a database is being used. This level of abstraction (305) between the application and storage takes advantage of the elements of the multi-user, simultaneous access that databases provide. The abstract layer may use database operations or non-database operations. This storage can persist across multiple boots of the individual nodes, which normally would not be available on these diskless nodes.

A compute node reboots when a new work request is executed. The configuration information is provided for each compute node of a parallel computer to specify which files/directories are used to keep persistent data for that node, so that the data will be available for that node from one boot to another. To further clarifying the process, an exemplar configuration information in one embodiment of the present invention is shown as follows:

| Persistent Filename or Directory Name | Is Sharable? |
|---|---|
| /var/lib/nfs/state | False |
| /var/run/randon-seed | False |

This configuration information specifies two directory names (/var/lib/nfs/state and /var/run/random-seed) that different nodes can use to store their data persistently. These directories cannot be shared among different nodes.

A database is used for the persistent storage of data in this example. In a preferred embodiment, the corresponding database table can be organized as:

| Persistent Filename/ Directory Name | Node number | StartOffset | Length | Data |
|---|---|---|---|---|
| /var/lib/nfs/state | 1 | 0 | 2056 | <data> |
| /var/run/randon-seed | 17 | 0 | 8 | <data> |
| /var/lib/nfs/state | 2 | 0 | 2056 | <data> |
| /var/run/randon-seed | 4 | 0 | 8 | <data> |
| /var/run/generalInfo | NULL | 128 | 32 | <data> |

In this example, a database table has five fields: persistent filename or directory name (f1), node number (f2), startOffset (f3), length (f4) and data (f5). It maintains the data (f5) of a node (f2) that is stored to location f1, where f3 and f4 are the information of the data f5 in the database. For example, the first row of this database table keeps the data that node 1 stored to /var/lib/nfs/state, which has a length of 2056 with an offset of 0. The fourth row keeps the data that is shared by all nodes and stored at /var/run/generalInfo, which is indicated by using NULL as the node number. Note that node 2 also writes to /var/lib/nfs/state. The third row of this database table keeps the data that node 2 stored to that location. Since this location (/var/lib/nfs/state) cannot be shared by multiple nodes, as specified in the configuration information, the database table uses different rows to maintain the data that was written to the same location by different nodes.

Figure 4:
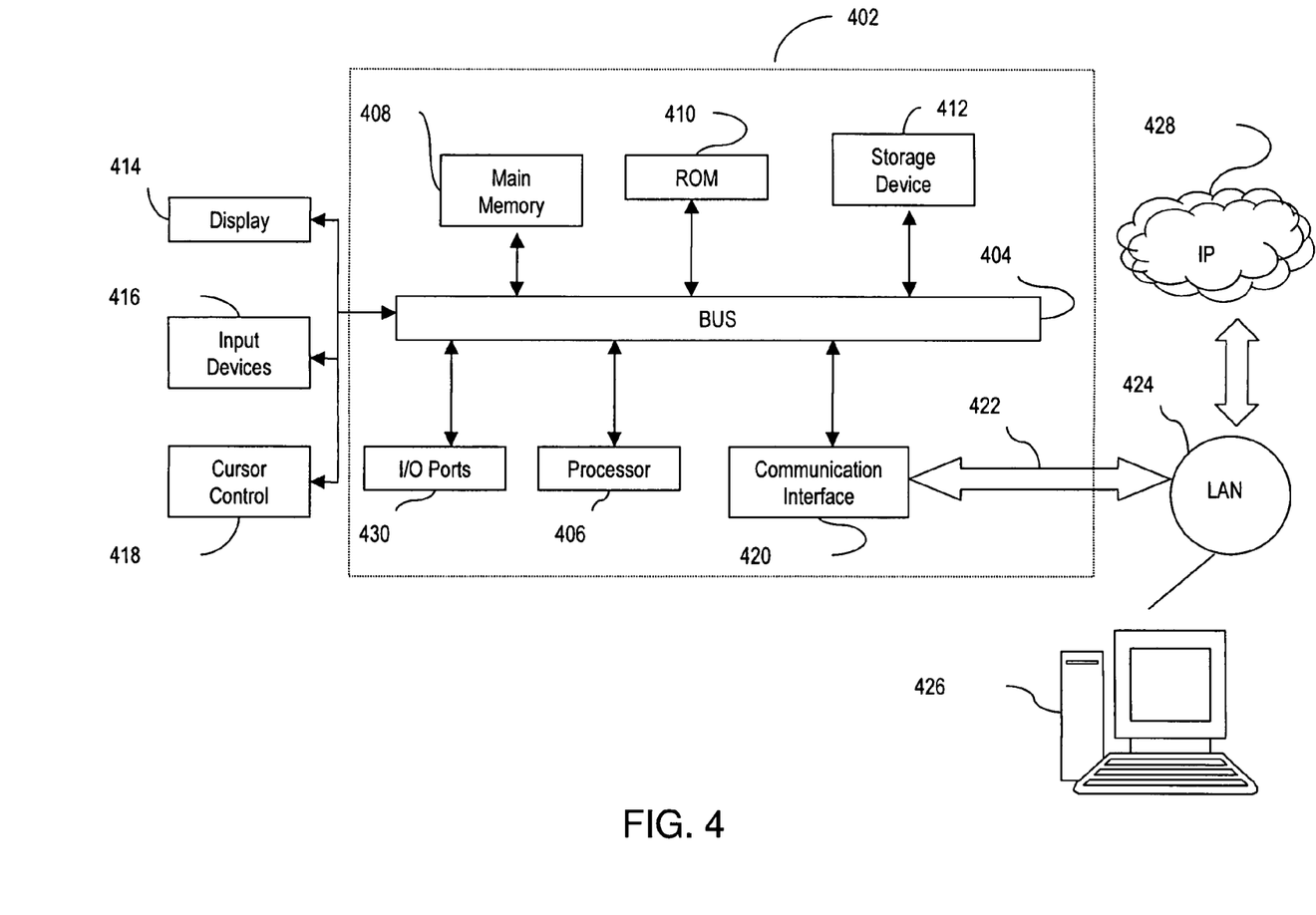
FIG. 4 is a conceptual diagram of a computer system in which the present invention can be utilized.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of a computer readable medium, upon which the program may be encoded.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406).

Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line. Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

An alternative embodiment of the present invention may be in the form a computer process running on one or more of the nodes of the massively parallel machine.

It should be understood, that the invention is not necessarily limited to the specific process, arrangement, materials and components shown and described above, but may be susceptible to numerous variations within the scope of the invention. Additionally, a person skilled in the art will readily be able to implement the source code and means of performing this optimization.

What is claimed is:

1. A method for persistent data storage for a computer system including a plurality of components that do not have local data storage, wherein the computer system is a massively parallel machine having a plurality of compute nodes and a central node, and each of the components is one of the plurality of compute nodes, comprising:
    providing a data storage system that is accessible by the plurality of components for persistent data storage;
    providing a repository that is accessible by each of the plurality of components, the repository containing, for each of the plurality of components, configuration information that includes a persistent data storage location in the data storage system for that component;
    responsive to a system operation request by one of the plurality of components, retrieving the configuration information corresponding to the component from the repository;
    analyzing the retrieved configuration information to decide whether the system operation request is to be executed by the data storage system;
    when, as a result of the deciding, the system operation request is to be executed by the data storage system, the data storage system executing the system operation request including reading from or writing to the persistent data storage location in the data storage system; and
    when, as a result of the deciding, the system operation request is not to be executed by the data storage system, executing the system operation request without using the data storage system.

2. The method of claim 1, wherein the system operation request is a file input/output operation.

3. The method of claim 1, wherein the repository is on the central node.

4. The method of claim 1, wherein the configuration information differs from compute node to compute node.

5. The method of claim 1, wherein the data storage system is a database.

6. The method of claim 1, wherein the retrieving is embodied as a computer process.

7. A computer program product for persistent data storage of a computer system, the computer system having a plurality of components that do not have local data storage, and a data storage system shared by the plurality of components for persistent data storage, wherein the computer system is a massively parallel machine having a plurality of compute nodes and a central node, and each of the components is one of the plurality of compute nodes, comprising:
    a non-transitory computer usable medium having computer usable program code embodied therewith, the computer usable program code comprising:
        instructions to maintain a repository that is accessible by each of the plurality of components, and to store, on the repository and for each of the plurality of components, configuration information that includes a persistent data storage location in the data storage system for that component;
        responsive to a system operation request by one of the plurality of components, instructions to retrieve the configuration information corresponding to the component from the repository;

instructions to analyze the retrieved configuration information to decide whether the system operation request is to be executed by the data storage system;

when, as a result of the deciding, the system operation request is to be executed by the data storage system, instructions for the data storage system to execute the system operation request including instructions to read from or to write to the persistent data storage location in the data storage system; and when, as a result of the deciding, the system operation request is not to be executed by the data storage system, instructions to execute the system operation request without using the data storage system.

8. The computer program product of claim 7, wherein the system operation request is a file input/output operation.

9. The computer program product of claim 7, wherein the repository is on the central node.

10. The computer program product of claim 7, wherein the configuration information differs from compute node to compute node.

11. The computer program product of claim 7, wherein the data storage system is a database.

12. The computer program product of claim 7, wherein the retrieving is embodied as a computer process.

13. A computer system comprising:
   a processor;
   a memory operatively coupled to the processor;
   a data storage system including a storage device operatively coupled to the processor and memory; and
   a computer program product for persistent data storage for a plurality of components of the computer system, the plurality of components having no local data storage and sharing the data storage system for persistent data storage, wherein the computer system is a massively parallel machine having a plurality of compute nodes and a central node, and each of the components is one of the plurality of compute nodes, comprising:
      a non-transitory computer usable medium having computer usable program code embodied therewith, the computer usable program code comprising:
         instructions to maintain a repository that is accessible by each of the plurality of components, and to store, on the repository and for each of the plurality of components, configuration information that includes a persistent data storage location in the data storage system for that component;
         responsive to a system operation request by one of the plurality of components, instructions to retrieve the configuration information corresponding to the component from the repository;
         instructions to analyze the retrieved configuration information to decide whether the system operation request is to be executed by the data storage system;
         when, as a result of the deciding, the system operation request is to be executed by the data storage system, instructions for the data storage system to execute the system operation request including instructions to read from or to write to the persistent data storage location in the data storage system; and
         when, as a result of the deciding, the system operation request is not to be executed by the data storage system, instructions to execute the system operation request without using the data storage system.

14. The computer system of claim 13, wherein the system operation request is a file input/output operation.

15. The computer system of claim 13, wherein the repository is on the central node.

16. The computer system of claim 13, wherein the data storage system is a database.

17. The computer system of claim 13, wherein the retrieving is embodied as a computer process.

* * * * *